United States Patent [19]

Duck

[11] Patent Number: 5,440,106
[45] Date of Patent: Aug. 8, 1995

[54] POINT-OF-SALE CHECK WRITING ASSIST APPARATUS

[75] Inventor: Thomas S. Duck, Tucson, Ariz.

[73] Assignee: Canard Resources, Inc., Tucson, Ariz.

[21] Appl. No.: 204,617

[22] Filed: Mar. 1, 1994

Related U.S. Application Data

[63] Continuation-in-part of Ser. No. 103,079, Aug. 6, 1993, Pat. No. 5,342,094.

[51] Int. Cl.⁶ .............................................. G07G 1/00
[52] U.S. Cl. ........................................ 235/3; 283/58; 283/81
[58] Field of Search ............... 235/3; 283/58, 60.1, 283/81, 60.2

[56] References Cited

U.S. PATENT DOCUMENTS

| | | |
|---|---|---|
| 1,608,294 | 11/1926 | Beman . |
| 1,868,188 | 7/1932 | Barker . |
| 2,693,909 | 11/1954 | Allan . |
| 3,455,576 | 7/1969 | Hammerling . |
| 3,790,193 | 2/1974 | McBride . |
| 4,082,873 | 4/1978 | Williams . |
| 4,346,917 | 8/1982 | Clancy .................... 283/58 |
| 4,379,573 | 4/1983 | Lomeli et al. . |
| 4,410,203 | 10/1983 | Lothrop ................... 283/81 |
| 4,508,962 | 4/1985 | Yamasaki ................ 235/3 X |
| 4,781,322 | 11/1988 | Humm . |
| 4,921,279 | 5/1990 | Hanna ..................... 283/58 X |
| 4,944,532 | 7/1990 | Pollard . |
| 4,948,174 | 8/1990 | Thomson et al. . |
| 4,974,878 | 12/1990 | Josephson . |
| 5,011,559 | 4/1991 | Felix . |
| 5,022,683 | 6/1991 | Barbour . |
| 5,071,167 | 12/1991 | O'Brien . |
| 5,121,945 | 6/1992 | Thomson et al. . |

FOREIGN PATENT DOCUMENTS 8526870 5/1987 United Kingdom .

Primary Examiner—M. L. Gellner
Assistant Examiner—Patrick J. Stanzione
Attorney, Agent, or Firm—Ogram & Teplitz

[57] ABSTRACT

A printer and system which assists in the preparation and completion of check writing at a point-of-sale. This system employs a printer which prints onto labels the critical areas of the check or negotiable instrument, such as: tendered amount, payee, and date. The labels are removed from their substrate and permanently adhered to the check. Further, a separate label, containing the same information, is supplied the customer for completion of the ledger associated with the check. In this manner, the entire check's writing process is completed quickly and efficiently, increasing the efficiency of the check-out counter.

32 Claims, 5 Drawing Sheets

POINT-OF-SALE CHECK WRITING ASSIST APPARATUS

This is a continuation-in-part of U.S. Ser. No. 103,079, now U.S. Pat. No. 5,342,094, filed Aug. 6, 1993, and entitled "An Improved Checking System".

BACKGROUND OF THE INVENTION

This invention relates generally to printed materials and more particularly to billing statements and negotiable instruments.

One of the most ubiquitous aspects of modern life is the bill or statement from the sundry institutions and companies which supply everything from water to electricity, from clothing to school tuition. The modern world would could not function without this short-term credit arrangement.

The well known procedures associated with the use of statements is that a statement is sent out to the user/consumer who then utilizes the information on the statement to complete a negotiable instrument such as a check. This creation of the negotiable instrument calls for the user to complete portions of the check which define the identification of the payee, the amount to be paid, the date of the instrument, and authorizing signature.

In many situations, the service provider also desires that an identifier number also be supplied on the negotiable instrument so that the check can be matched to a specific customer. Sometimes this identifier is a long complex arrangement of letters and numbers which requires great concentration on the part of the user in completing.

Because of the large number of checks which are completed by each household and business bi-monthly, the consumer/user becomes increasingly fatigued and irritable which causes their handwriting to degrade to a point where it is almost impossible to read or discern what is being written.

Even further, for many elderly check writers, they easily become confused and often enter conflicting information on the check. This usually occurs where the amount is to be written as a numeral and where the amount is to be written in alphabetical terms. This ambiguity results in a check being returned to the user which furthers the accounting problems.

At other times, the formal name for the payee is shortened or miswritten which also results in the check being returned without crediting of the account. This often happens when the name of the payee is extremely long or where the company is commonly known by a nick-name (i.e. Mountain Bell Telephone Company, aka "Ma Bell").

If completing of checks poses a problem for the consumer, the problem of processing the millions of checks daily by the banks and major suppliers would seem next to impossible. The supplier is faced with the problem of properly crediting the various accounts; the bank must debit the proper account and assure that the correct credit is given to the supplier.

Even in the best of situations, the reading of handwriting requires the use of human operators at the banks to enter the amounts on the checks. In some situations, the computers have been designed to automatically read the account number for the check which is combined with the human entered amount value.

Because of this approach, which is forced on the banks by the basic nature of the check, errors occur and the cost of processing the checks so that proper credit and debit are made, increases.

Typically this process falls to a mind-numbing menial task which has not much changed since the middle ages; manually read the check and entering the value in the proper column. Automating this process has proven extremely difficult and continues to a large extent to evade the ability of computer programmers.

Because of the processing problems, numerous attempts have been made to facilitate the process and to remove the chances of errors. Examples of these attempts include: U.S. Pat. No. 3,455,576, entitled "Means for Preventing Unauthorized Cashing of Checks" issued to Hammerling on Jul. 15, 1969; and U.S. Pat. No. 5,022,683, entitled "Check Insert and Envelope" issued to Barbour on Jun. 11, 1991. Hammerling utilizes colored labels for placement on the back of the checks so that a counterfeiting endorsement of the check is more difficult; Barbour creates a card support for the check so that it can be machine managed more efficiently.

In neither of these situations though is the basic problem addressed and in both of these situations there still is required the human intervention in the processing of the checks which can result in a great deal of imposed error and cost.

It is clear from the foregoing that an efficient and cost effective method of handling checks is not available and is needed.

SUMMARY OF THE INVENTION

The invention is a printer and system which assists in the preparation and completion of check writing at a point-of-sale. The vast majority of checks written in the United States are prepared at the point-of-sale where a purchase has been made. Completion of the check is a time consuming operation which forces other customers to wait while the check is being prepared. This system employs a printer which prints onto labels the critical areas of the check or negotiable instrument, such as: tendered amount, payee, and date. The labels are then removed and permanently applied to the check, thereby reducing the completion of the check to a simple task of signing it. Further, a separate label, containing the same information, is supplied the customer for completion of the ledger associated with the check. In this manner, the entire check is completed quickly and efficiently, increasing the efficiency of the check-out counter.

A further aspect of the invention is an improved statement in which removable labels are included with the statement. These labels, although removable from the statement, adhere permanently to a negotiable instrument and provide for efficient and exacting completion of the negotiable instrument. A negotiable instrument, such as a check, contains several portions which are blank and are to be completed by the user. These blank portions include such components as: the payee's name, the amount to be paid, and a reference line.

The removable labels from the statement are printed with the statement to provide permanent labels to fill-in these components by simple removal from the statement and permanent adhesion to the check. Once the labels are affixed, the user simply dates and signs the check for it's proper completion.

This process assures that the critical areas of the check are completely and legibly completed. Elderly people are given the ability to complete a check with a minimum of writing without the worry that their handwriting will be misread by the bank or the supplier. The supplier/creditor is assured that the checks have the proper payee and amount presented.

Because labels are used for the critical areas of the negotiable instrument, their processing by the billing entity is more efficient (permitting machine reading of the check) and more exact since bank operators need not struggle with "poor handwriting". Rather, computer programming for optical character recognition is readily available for almost all printed material and even bar-code printing can be used to rapidly and efficiently identify the consumer.

To a very large extent if not totally, the processing of the checks is completed totally through automation, thereby significantly increasing the efficiency and reducing the error rate while reducing the cost and relieving humanity of this mindless crunching of numbers.

In the preferred embodiment, the labels are substantially clear with the printing on one side of the label. Once the label is permanently affixed to the check, any later attempts to manipulate the check's contents is readily and easily discerned. As example, should a counterfeiter attempt to place another payee label over the top of the completed check, the underlying payee portion is obvious to the bank and would be instantly "flagged" and reported to the proper authorities; alternatively, if the counterfeiter attempts to remove the label, the label will tear and disfigure the check rendering it void.

Removal of the label from the statement and its permanent adhesion to the check is through a variety of techniques well known to those of ordinary skill in the art. Examples of labels which will serve in this function include those shown by: U.S. Pat. No. 5,071,167, entitled "Shipping and Return Mailing Label" issued to O'Brien on Dec. 10, 1991; U.S. Pat. No. 4,379,573, entitled "Business Form with Removable Label and Method for Producing the Same" issued to Lomeli et al. on Apr. 12, 1983; and U.S. Pat. No. 4,082,873, entitled "Switch-Proof Label" issued to Williams on Apr. 4, 1978; all of which are incorporated hereinto by reference.

The labels are intended to be easily removed from the statement and yet permanently adhered to the negotiable instrument.

A variety of embodiments exist for the placement of the labels. The preferred embodiment has the label or labels put onto the statement form prior to its printing so that the printing process simply completes the label on the statement as it is printing the statement. A second embodiment uses a sheet holding the labels which is processed and which is sent to consumer with the statement and is associated with the statement.

In either case, the result is providing the consumer with labels to facilitate the proper completion of a negotiable instrument.

In regards to the point-of-sale application, the invention is a printer and system which assists in the preparation and completion of check writing at a point-of-sale. The vast majority of checks written in the United States are prepared at the point-of-sale where a purchase has been made. Completion of the check is a time consuming operation which forces other customers to wait while the check is being prepared.

This system employs a register communicating with a printer. The printer prints onto labels the critical portions of the check or negotiable instrument, such as: tendered amount, payee, and date. The labels are then permanently applied to the check, thereby reducing the completion of the check to a simple task of signing it. The speed in which a check is completed renders the check-out counter more efficient, thereby permitting a retail store to minimize its requirements for registers.

Further, a separate label, containing the same information, is supplied the customer for completion of the ledger associated with the check. The customer then has a complete and accurate record of the transaction. In this manner, the entire check is completed quickly and efficiently, increasing the efficiency of the check-out counter while making the process easier on the customer.

The invention, together with various embodiments thereof will be more fully illustrated by the drawings and the following descriptions.

DRAWINGS IN BRIEF

Figure 6:
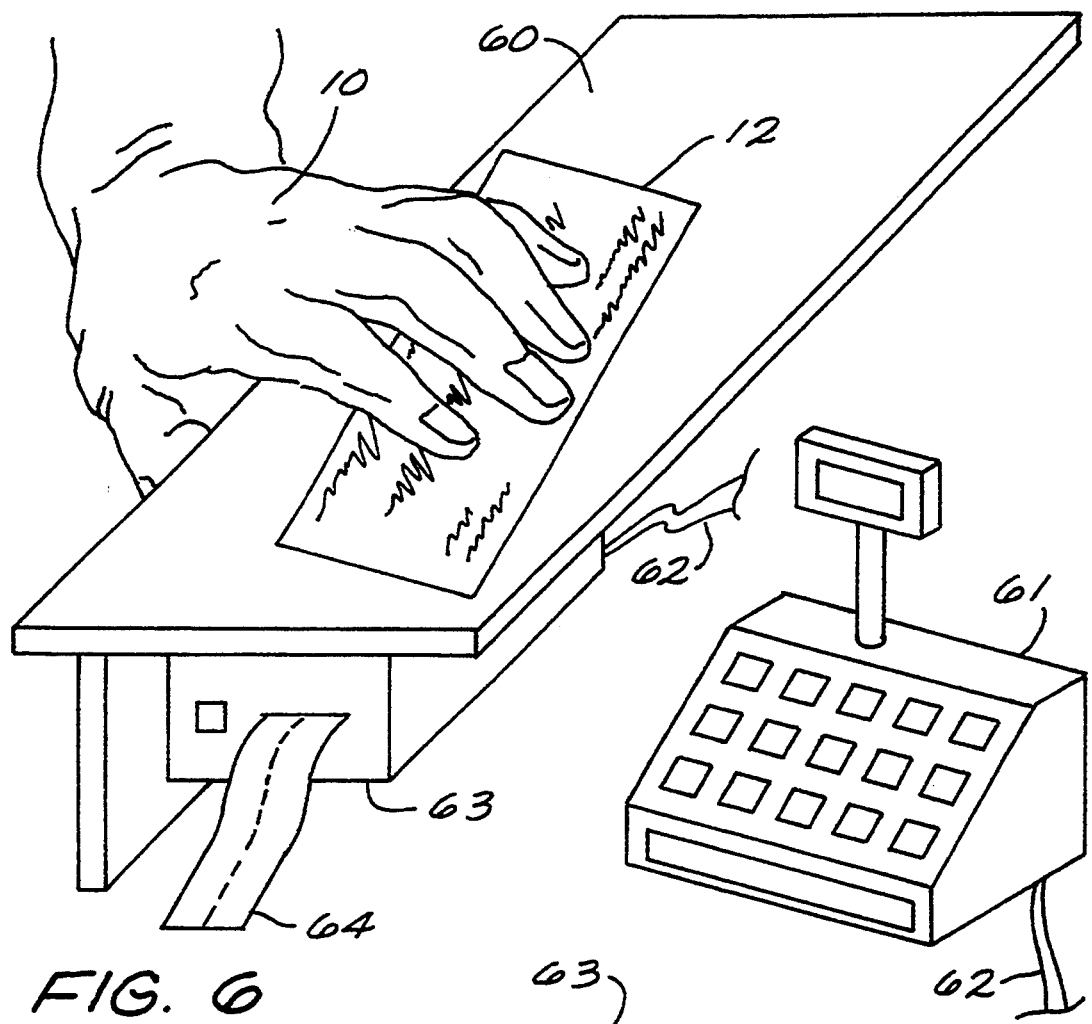

FIG. 6 diagrams the interaction between the cash-register and the printer of the present invention in the point-of-sale embodiment.

Figure 7:
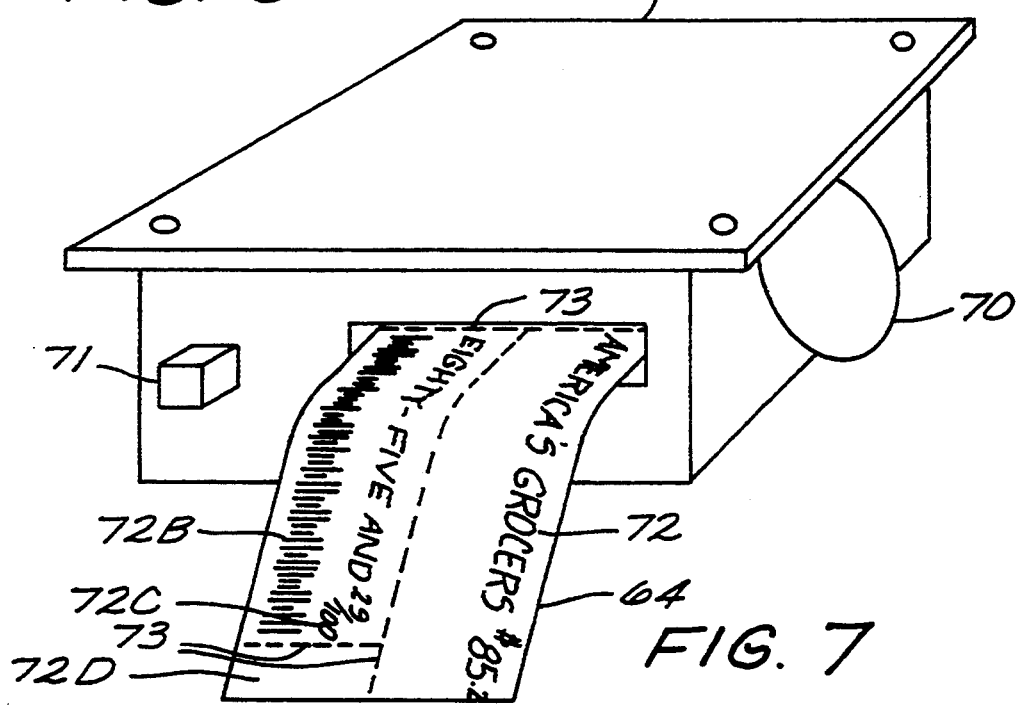

FIG. 7 is a perspective view of the printer first illustrated in FIG. 6.

Figure 8A:
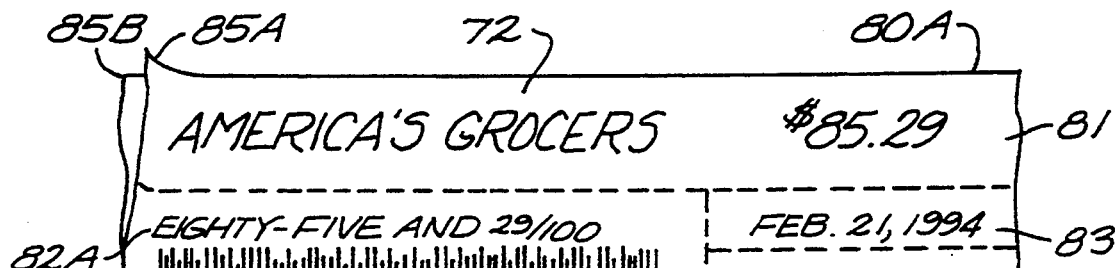
Figure 8B:
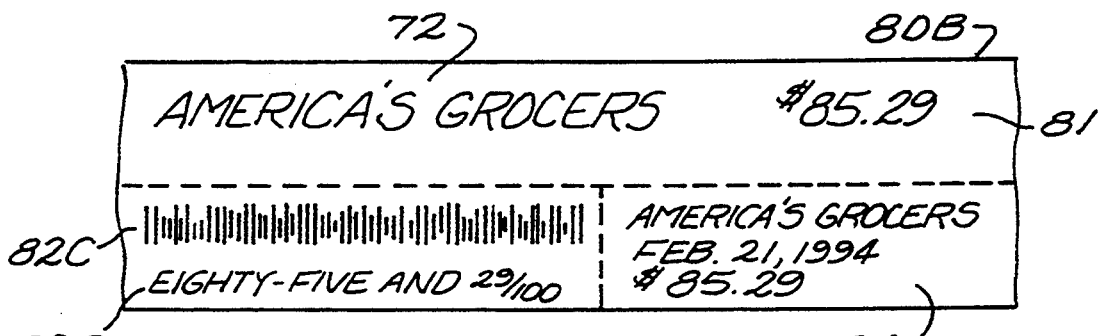

FIGS. 8A and 8B illustrate two embodiments of the labels used in the point-of-sale application.

Figure 9:
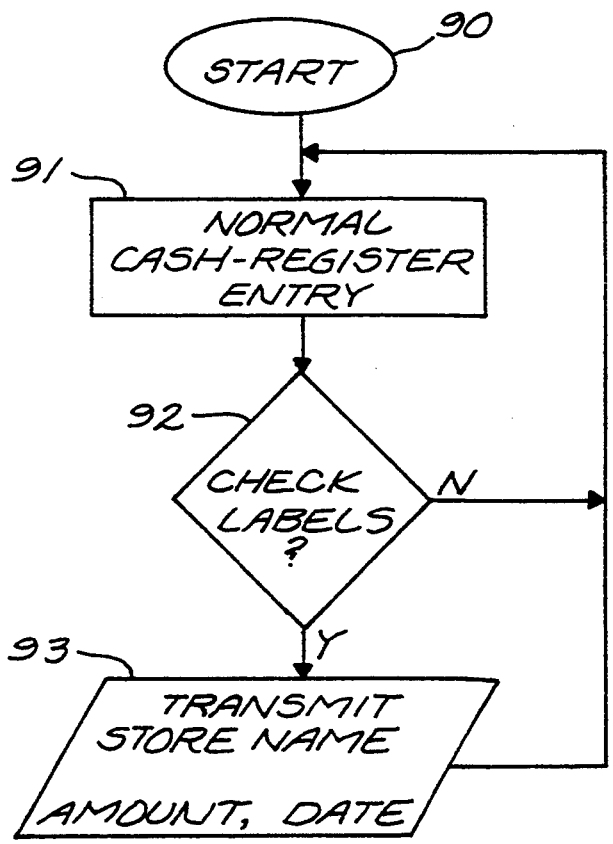

FIG. 9 is a flow-chart illustrating the operation of the computer at the cash register in creating the labels for the point-of-sale.

DRAWINGS IN DETAIL

Figures 1A, 1B:
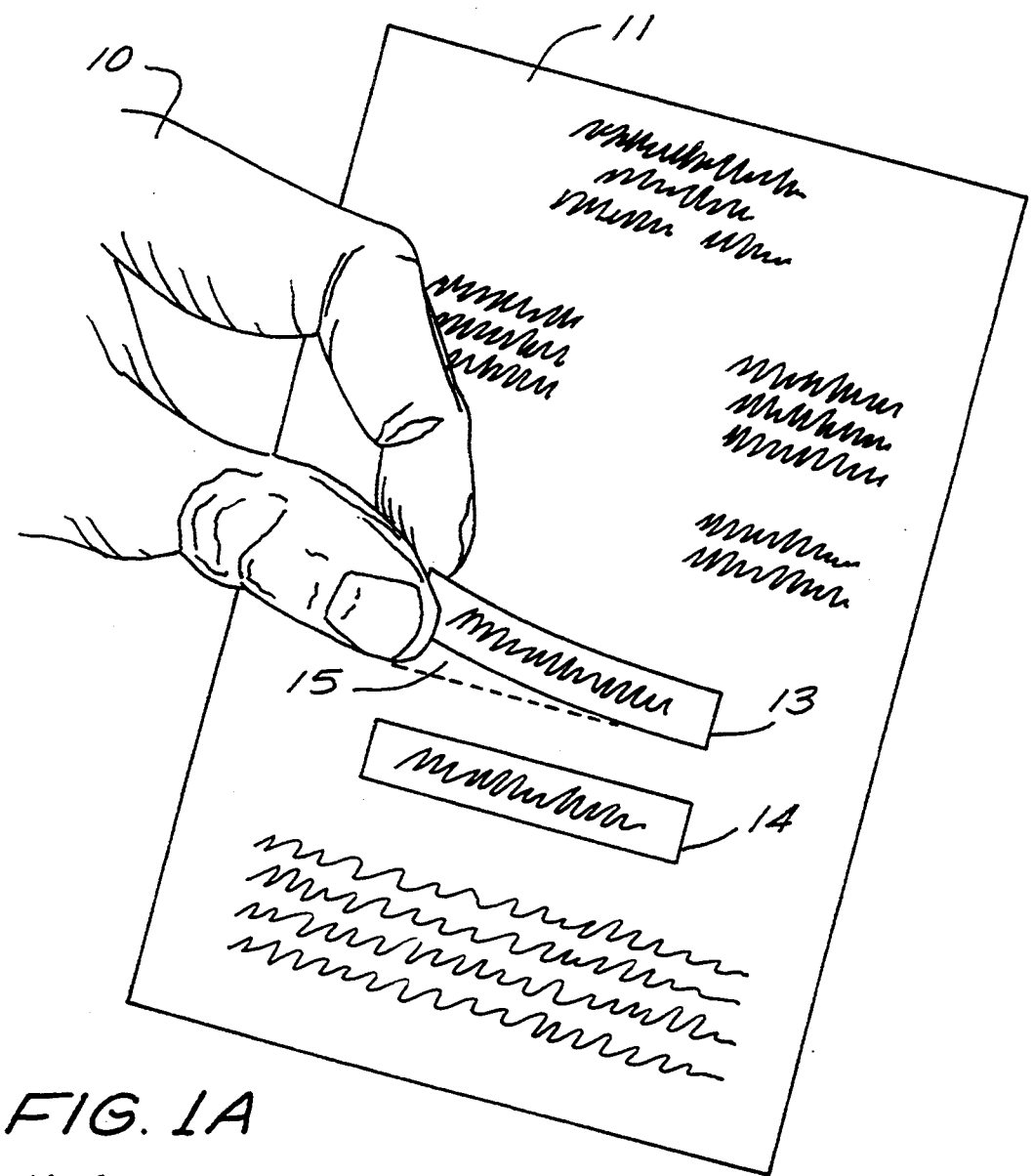
FIG. 1A is a perspective view of the preferred embodiment of the invention showing the use of the label on a statement.
FIG. 1B is a frontal view of a typical negotiable instrument.

FIG. 1A is a perspective view of the preferred embodiment of the invention showing the use of the label on a statement.

In this embodiment, labels 13 and 14 are detachably secured to the statement 11. User 10 is able to remove the label, as shown with label 13, through manual manipulation of the label. Labels 13 and 14 are kept from permanent adhesion to statement 11 through the use of a coating (as shown by coating 15). Through proper placement of the coating and the subsequent placement of the labels on the blank statement, the printing of the statement both prints out standard billing information for the user and also completes the labels for the user to utilize in the completion of the negotiable instrument.

Those of ordinary skill in the art readily recognize various methods and materials which will create a statement as described above.

Figure 1B is a frontal view of a typical negotiable instrument.

A negotiable instrument such as check 12 has a variety of areas or portions which must be completed to make the instrument negotiable. The requirements for a negotiable instrument are established through banking custom and the Uniform Commercial Code.

Typically a check 12 must have completed the date of payment 16E, the name of the ordered payee 16A, the amount to be paid both in numerals 16C and in written alphabetical form 16D, and the signature of the party making the order of payment 16F.

Additionally, most suppliers/creditors also require that their individualized assigned customer number be written on the check 12, usually in position 16B. This assures that proper credit is given to the customer by the supplier.

Bank number 17 is used by the financial institution to properly debit the account of the user.

In the preferred embodiment, when using the statement, such as illustrated in FIG. 1A, in conjunction with the check of FIG. 1B, user 10 removes the labels supplied on the statement 11 and places the labels in the correct portion of check 12.

Depending on the number of labels supplied, various areas such as payee 6A, amounts 16C and 16D, and the reference 16B, are completed; thus reducing the task for the user to simply date (16E) and sign (16F) the check to make it a negotiable instrument.

Certain banks and other financial institutions also permit the use of a single label which extends to include both the name of the payee 16A and also the numerical dollar amount 16C. As example, the label for payment to the Tucson Electric Power for the amount one hundred fifty three dollars and ten cents may read:

TUCSON ELECTRIC POWDER $153.10

In other situations, the name may be curtailed to its letter representations with the customer's account number following. In this situation the label may read:

Tep account number 0234/A8$153.10

For either of these two situations, a single label is utilized to establish and complete several portions of the negotiable instrument.

Although the present discussion relates to checks, those of ordinary skill in the art readily recognize that the present invention could also be utilized for other negotiable instruments such as a bill of exchange, a promissory note, bearer bond, or the like.

Figure 2:
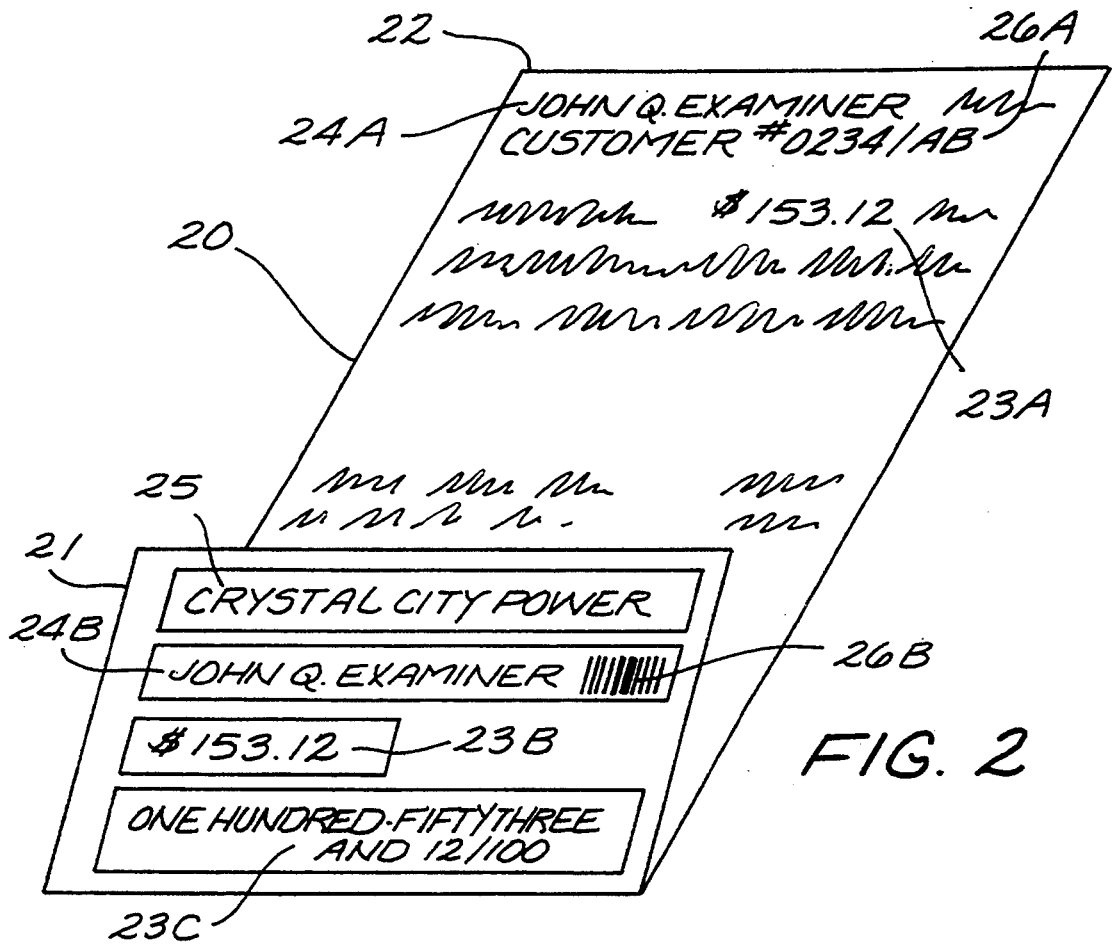
FIG. 2 is a perspective view of an alternative embodiment of a statement illustrating the use of a separate component for the labels.

FIG. 2 is a perspective view of an alternative embodiment of a statement illustrating the use of a separate component for the labels.

In this embodiment of the statement, the labels are not on the statement 22 itself but rather are associated with the statement via attachment 21.

As noted in this figure, certain information is contained in duplicate both in the statement and also on the labels. As shown here, the customer's name appears on the statement 24A and also on the labels 24B. The amount to be paid is printed on the statement 23A, and also in numerical form 23B and alphabetical form 23C on the labels.

The customer's name is on the statement 24A and is repeated on label 24B. Note that in this embodiment, the customer number or identifier 26A (written in human readable form) is printed as bar-code indicia 26B on the labels to facilitate the ready reading of the information by machine by either the supplier's book-keeping department and/or at the bank.

Bar-Code representations can be used in several of the label embodiments and may be printed either in visible or invisible ink. The use of invisible ink, readable using ultra-violet light, is advantageous since it permits easy machine readability without undue confusion on the part of the human user.

To additionally improve the machine readability of the labels, magnetic ink is also available to enhance the machine's "vision" of the printing. This further reduces the possibility of error.

Figure 3:
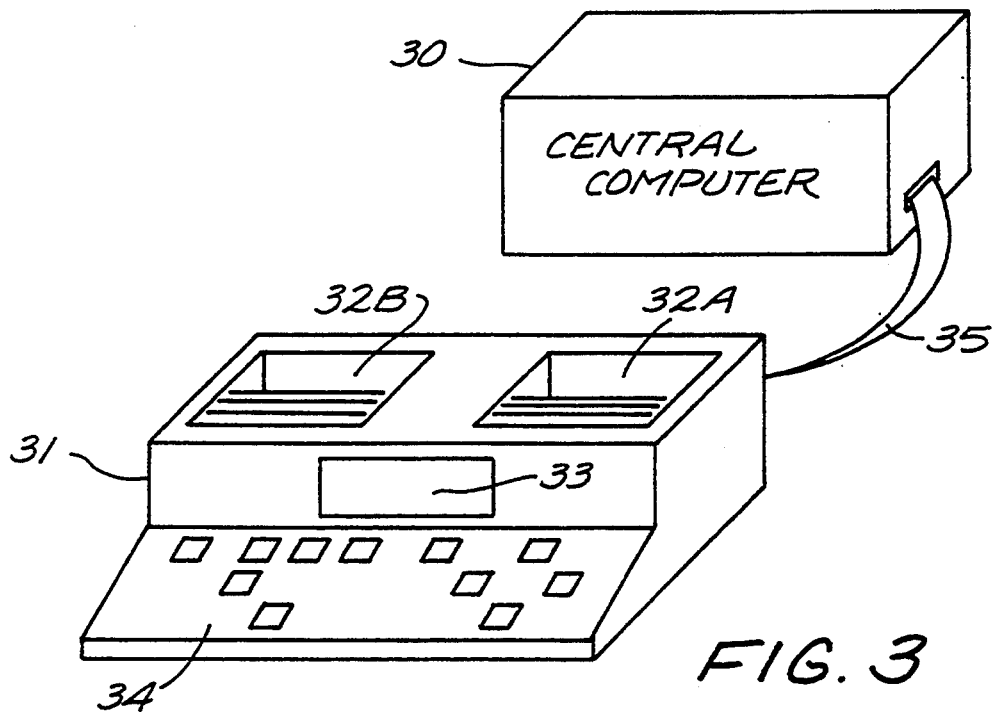
FIG. 3 is a block diagram of the preferred embodiment reading and storage apparatus as used by banks and suppliers/creditors.

FIG. 3 is a block diagram of the preferred embodiment reading and storage apparatus as used by banks and suppliers.

In this embodiment, a multitude of readers 31 are attached to Central Computer 30 (only one reader is shown in this figure). Each reader 31 contains an input tray 32A for receipt of new checks for processing and an output tray 32B for checks which have been duly entered.

Checks from input tray 32A are drawn into the reader 31 via a feed mechanism well known to those of ordinary skill in the art and are scanned automatically to determine if the checks utilize the labels discussed above. If the labels are used, then reader 31 is able to automatically withdraw the information for proper storage within the memory of central computer 30; if the labels are not fully used, then the check is displayed in window 33 and the operator, not shown, is able to supply the proper data via keyboard 34.

In this manner, the system of FIG. 3 is able to automatically process checks which utilize the invention's label while permitting it also to handle traditionally completed checks.

Figure 4:
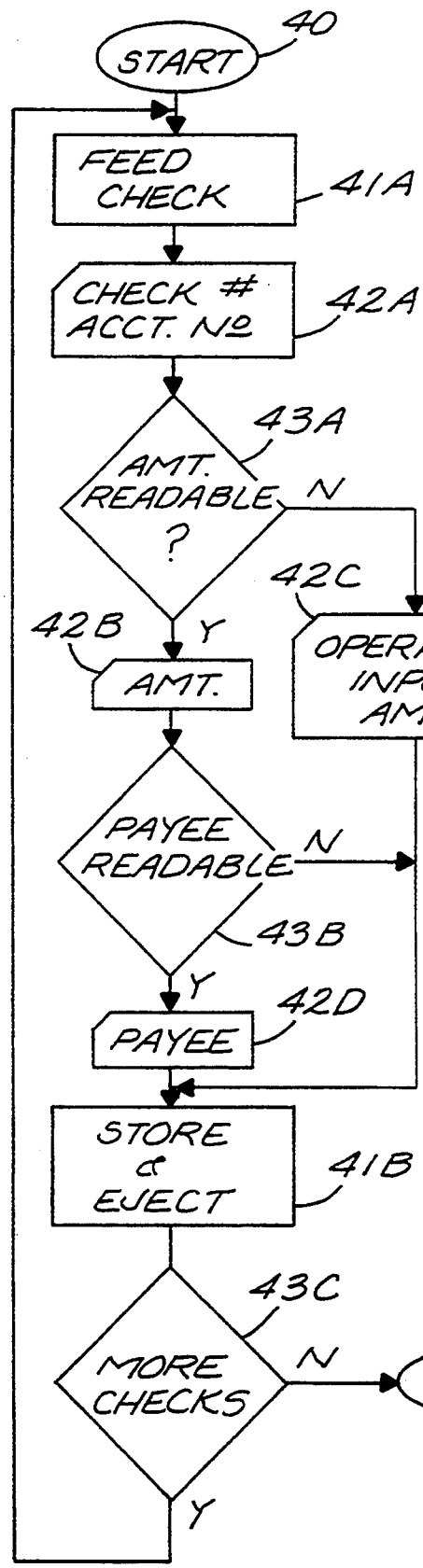
FIG. 4 is flow chart of the preferred operation of the reading and storage apparatus when used by a bank.

FIG. 4 is flow chart of the preferred operation of the reading and storage apparatus when used by a bank.

The apparatus as shown in FIG. 3 is programmed to utilize the software discussed relative to FIG. 4, thereby addressing the entry of the check into the bank's accounting procedures.

Once the machine is started, 40, a check is fed 41A into the mechanism from the input tray. The check's number and account number are read 42A and stored into memory. Next, a determination as to whether a label has been used for the amount of the check, 43A is made. If a label has been used, the reader automatically withdraws this information from the check, 42B; otherwise, the operator must input the dollar amount 42C.

Determining if the amount is readable is simply done by attempting to read the value. An error in the read operation indicates either that a label was not used or that a defect exists and the label used is unreadable; in either case, the amount must be entered manually.

Because of the label system utilized, an additional capability available is determining if a payee name is readable 43B and then automatically reading this name 42D into memory. Currently, this capability is not available for most check writers as it would require additional work for the bank; in this case, using labels, the name of the payee is automatically withdrawn and does not require any additional effort or expense on the part of the bank.

Once all of the information is collected, the data is stored and the check is ejected to the output tray 41B. An analysis is made to determine if there are any more checks to process 43C. If there are, then the check is fed into the mechanism 41A and the process repeats itself; if there are no more checks to process, then the process terminates 44.

In this manner, the checks are properly entered and their data is stored for handling by the accounting program.

Figure 5:
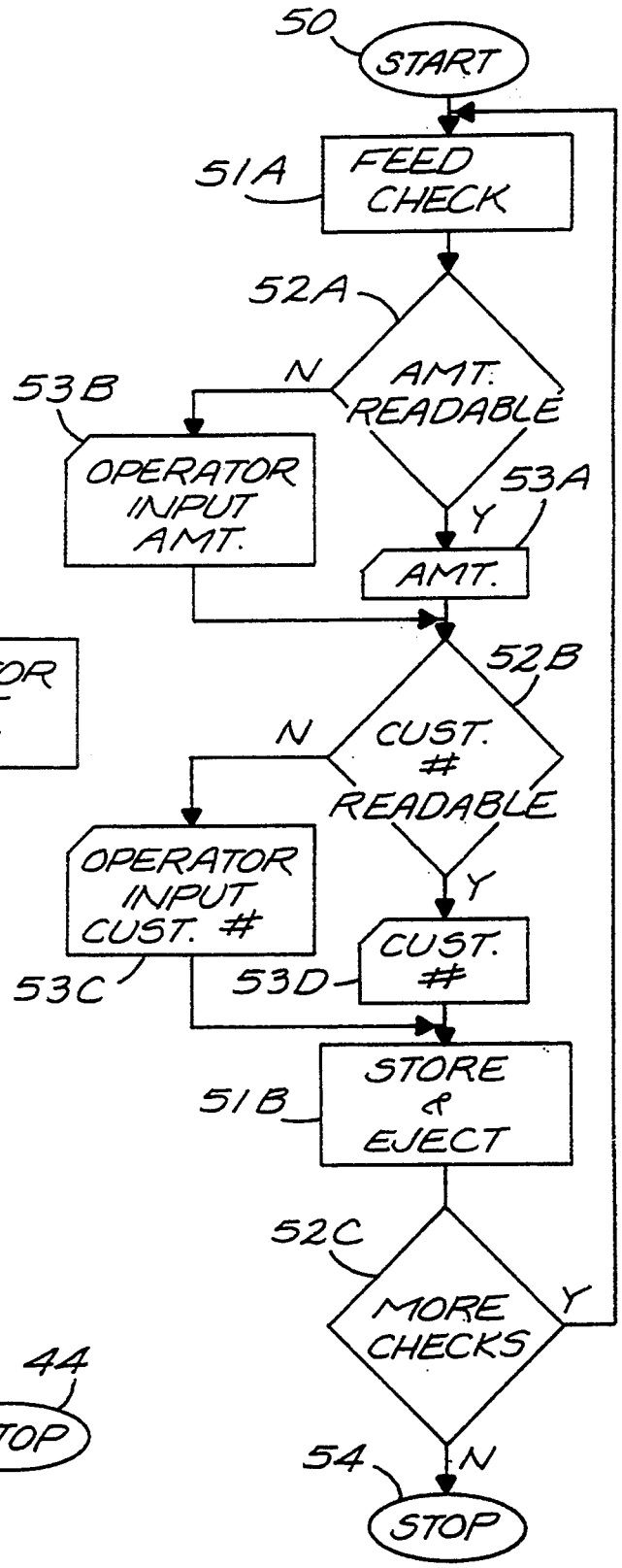
FIG. 5 is a flow chart of the preferred operation of the reading and storage apparatus when used by a supplier/creditor.

FIG. 5 is a flow chart of the preferred operation of the reading and storage apparatus when used by a supplier/creditor.

Again, the apparatus of FIG. 3 is utilized for the entry of the data from the check, except that in this application, the data being collected is to be used by the supplier or creditor of the check writer.

Once start 50 has occurred, a check is fed into the reader 51A. A determination is made if the amount is readable 52A and that amount is automatically read 53A if possible. If the amount is not readable, then the operator must manually enter the amount 53B.

If the customer number is readable 52B, the customer number is automatically read 53D; otherwise, the operator inputs the customer number 53C.

The data so collected is then stored in the central memory and the check is ejected to the output tray 51B. Should there be more checks to process 52C, then the program returns to feed another check into the reader, 51A, and the program repeats itself; otherwise, the program terminates, 54.

In this manner, the operator is relieved of having to enter any data from checks which utilizes the present invention's check labeling system.

FIG. 6 diagrams the interaction between the cash-register and the printer of the present invention in the point-of-sale embodiment.

The point-of-sale assembly of this invention is composed essentially of a register (such as a cash register) 61, label printer 62, and a communication link 62 therebetween. Label printer 62 receives its data and instructions from the register 61. Preferably, register 61 is programmable so that it has maximum flexibility relative to the label printer 63.

Customer 10 seeks to pay for the merchandise using check 12, as described before. Table 60 is provided for the customer 10 with label printer 63 secured thereunder. Using instructions and data from register 61, label printer 63 creates a label 64 which is used by the customer for the completion of check 12. The task associated with completing the check is reduced to simply placing the completed labels on the check and signing it.

In this embodiment, the printer and register are shown as two separate mechanisms. In another embodiment of the invention the label printer is incorporated into the register's housing. In this alternative embodiment, the labels are delivered to the register operator who hands them to the customer for completion of the check. Other various embodiments are obvious to those of ordinary skill in the art.

FIG. 7 is a perspective view of the printer first illustrated in FIG. 6.

As noted earlier in FIG. 6, label printer 63 generates labels 64 for use by the customer. Labels 64 are, in this embodiment, composed of several individual labels which have serrations 73 created between them by label printer 63. The serrations are formed by any means well known to those of ordinary skill in the art.

The use of serrations permit a roll or reel of labels to inserted into the label printer 63 via opening 70 and then the label printer to create the labels having the size and shape desired.

In this illustration, label 64 is composed of only two principal sections: payee's name with numerical amount 72A; and, written amount 72C with bar-code representation 72B. The payee's name with numerical amount label is used to complete sections 16A and 16C of the negotiable instrument (FIG. 1B); while the written amount label 72C, with bar-code representation 72B, is used to complete section 16D (FIG. 1B).

The amount printed onto the label is usually the amount of the sale. In some situations, the amount tendered exceeds the sale amount (if cash-back is sought by the customer) or is less than the sale amount (where the check is combined with either cash or a gift certificate). In all of these cases, the amount to be printed onto the label is the amount tendered for the purchase.

The payee's name includes any indicia of the store or location. In some instances this indicia may be the full name of the store, or it may be a commonly accepted initial representation of the name.

In this embodiment, the tendered amount and the name of the store is transmitted from register 61 via communications link 62 for each sale. In other embodiments, the name of the store is transmitted only once during initiation or start-up of the register and thereafter only the tendered amount is transmitted; the label printer 63 combines the tendered amount with the store name (previously stored in a local memory) for the creation of the labels.

Portion 72D is waste and is discarded.

In this illustration, completion of the check requires only dating and signing of the instrument.

In this embodiment of the label printer, customer-button 71 is provided which permits the customer to indicate when labels are required. Some customers will still want to complete their checks in the traditional longhand manner; but, should a customer want to have the labels supplied to him, simply pushing customer-button 71 indicates to the printer to print out the labels when the register has completed its task and has computed the tendered amount.

In this application, the customer-button 71 may be activated at any time and label printer 63 waits until the appropriate data is received from register 61.

In this embodiment of the invention, a reel or roll of label material is used. In other embodiments of the invention, pre-cut labels are also supplied either by roll or on flat stock. The flat stock embodiment permits the labels to be inserted into the label printer much the same as blank paper into a photo-copier and are then fed to the printing mechanism one at a time. Those of ordinary skill in the art readily recognize various mechanisms which will serve in this manner.

FIGS. 8A and 8B illustrate two embodiments of the labels used in the point-of-sale application.

FIG. 8A illustrates an embodiment of the invention which creates a label 80A composed of: payee name with numerical amount 81; written amount 82A with bar-code 82B; and, date 83. In this embodiment, the labels are used to complete the entire check leaving only its signature necessary to render it negotiable.

The labels are peeled from a substrate as shown by 85A and 85B. Although the use of a substrate to support the labels and maintain the underlying glue's integrity is the preferred embodiment, it is also contemplated that the present invention could be used with a label system which does not require a substrate but which activates the glue for application to the check. One such label applies the glue after the material has been printed and as the label leaves the printer. Those of ordinary skill in the art readily recognize various other arrangements which will work in this context.

FIG. 8B illustrates another arrangement for the labels 72A showing: payee with numerical tendered amount 81; written amount 82D with bar code 82C; and ledger portion 84. In this embodiment, the bar-code 82C, once placed on the check is bracketed by the payee label 81 and the written amount 82D. This arrangement has been shown to be superior in readability of the bar-code since the code is not close to any other printing which could be confusing or distracting to the machine reader.

Bar-Code 82B, 82C, is any of the many forms well known to those of ordinary skill in the art and is not limited to merely being a machine-readable form of the tendered amount. Other information may be included in the bar-code which is of relevance or importance to the retail store.

Ledger portion 84 provides added assistance to the customer since it is used by the customer to complete their ledger portion associated with the check 12. The ledger portion is that written material which is the customer's record of the specifics of the check. In this instance, the payee's name, date of the check, and the check amount is provided on a peel-and-stick label which is placed into the ledger for later balancing of the customer's checkbook.

FIG. 9 is a flow-chart illustrating the operation of the computer at the cash register in creating the labels for the point-of-sale.

Once start has occurred 90, the register performs its normal and traditional registering function 91 in ringing up the purchases and adjusting for coupons and taxes. A query is made to determine if labels are sought, 92. If no labels are sought, then the operation returns to the normal function 91; otherwise, the store's name, the tendered amount, and the date are transmitted to the label printer.

Through this simple operation, check completing labels are provided to the customers who sought them. Those of ordinary skill in the art readily recognize various other operational arrangements which will accomplish the objectives of the present invention.

It is clear from the foregoing that the present invention creates a highly improved system for statement and check writing while improving on the payment processing, related banking activities, and point-of-sale operation.

What is claimed is:

1. An point-of-sale apparatus designed to assist in check writing comprising:
   a) registering means for determining a tendered amount;
   b) a reel of adhesive label removably attached to a substrate, said adhesive label being permanently bondable to paper; and,
   c) printer means, in communication with said register means, for printing the tendered amount onto a first adhesive label portion of said tape.

2. The apparatus according to claim 1 wherein said printer means further prints a store's name onto a second adhesive label portion.

3. The apparatus according to claim 2 wherein said store's name is communicated by said registering means.

4. The apparatus according to claim 2 wherein said printer means further prints the tendered amount and the store's name onto a separate adhesive label portion.

5. The apparatus according to claim 2 wherein said printer means further prints a date onto a third removable label portion.

6. The apparatus according to claim 2 wherein said printer means includes a receptacle for holding said reel of adhesive label.

7. The apparatus according to claim 6 wherein said printer means includes means for creating serrations at selected locations in said adhesive label.

8. The apparatus according to claim 7 wherein said printer means is activated via a customer-activated switch.

9. The apparatus according to claim 2 wherein said first label portion includes a machine-readable representation of said amount due.

10. The apparatus according to claim 9 wherein said machine-readable representation includes a bar-code representation.

11. The apparatus according to claim 10 wherein the amount due is printed in both machine-readable form and in human-readable form.

12. A system designed to assist in check writing at a point of sale, said system comprising:
   a) registering means for determining a tendered amount;
   b) an adhesive label being permanently bondable to paper; and,
   c) printer means, in communication with said register means, for printing onto a first adhesive label, the tendered amount.

13. The system according to claim 12 further including a second label being permanently bondable to paper and wherein said printer means further prints an indicia of a store's name onto said second label.

14. The system according to claim 13 further including a third label being permanently bondable to paper and wherein said printer means prints a date onto said third label.

15. The apparatus according to claim 13 further including another label being permanently bondable to paper and wherein said printer means further prints the tendered amount and said indicia of a store's name onto said separate label.

16. The system according to claim 13 wherein said store's name is communicated by said registering means.

17. The system according to claim 13 wherein said printer means includes a receptacle for holding a plurality of adhesive labels.

18. The apparatus according to claim 17 wherein said plurality of adhesive labels are in a reel arrangement.

19. The system according to claim 18 wherein said printer means includes means for creating serrations at selected locations during unwinding of said reel arrangement of adhesive label.

20. The system according to claim 13 wherein said printer means is activated via a customer activated switch.

21. The system according to claim 13 wherein said first label includes a machine-readable representation of said tendered amount.

22. The system according to claim 21 wherein said machine-readable representation includes a bar-code representation.

23. The system according to claim 21 the tendered amount is printed in both machine-readable form and in human-readable form.

24. A printer designed to assist in check writing at a point of sale, said printer being responsive to a computer and comprising:
a) a printer housing having therein:
1) a plurality of adhesive labels being permanently bondable to paper, and,
2) a printer mechanism for printing onto a first adhesive label, a tendered amount; and,
b) a communication means for communicating data and instructions from said computer to said printer mechanism.

25. The printer according to claim 24 wherein said printer mechanism further prints an indicia of a store's name onto a second adhesive label.

26. The printer according to claim 25 wherein said printer mechanism prints an indicia of a date onto a third removable label.

27. The printer according to claim 24 wherein said printer mechanism further prints the tendered amount and said store's name onto a separate removable label.

28. The printer according to claim 24 wherein said adhesive labels are arranged in a reel-arrangement.

29. The printer according to claim 28 wherein said printer further includes means for creating serrations at selected locations in said reel-arrangement of adhesive labels.

30. The printer according to claim 24 wherein said printer mechanism is activatable via a customer-activated switch.

31. The printer according to claim 26 wherein said printer mechanism includes means for printing in machine-readable representation.

32. The printer according to claim 31 wherein said machine-readable representation includes a bar-code representation.

* * * * *